US006865988B1

(12) United States Patent
Sasaki

(10) Patent No.: US 6,865,988 B1
(45) Date of Patent: Mar. 15, 2005

(54) TRANSFER FOIL FOR GOLF BALLS

(75) Inventor: Takashi Sasaki, Akashi (JP)

(73) Assignee: Sumitomo Rubber Industries Limited, Kobe (JP)

( * ) Notice: Subject to any disclaimer, the term of this patent is extended or adjusted under 35 U.S.C. 154(b) by 538 days.

(21) Appl. No.: 09/654,053

(22) Filed: Sep. 1, 2000

(30) Foreign Application Priority Data

Sep. 7, 1999 (JP) .......................................... 11-253260

(51) Int. Cl.[7] ............................ B41F 7/02; B41J 31/09; B32B 27/38

(52) U.S. Cl. ............... 101/483; 101/492; 101/DIG. 40; 400/237; 428/413; 428/403.1; 428/195

(58) Field of Search ................................ 101/483, 492, 101/DIG. 40; 400/237; 428/413, 403.1, 195, 423.1

(56) References Cited

U.S. PATENT DOCUMENTS 5,070,121 A * 12/1991 Hinterwaldner et al. ......... 33/8
5,594,044 A * 1/1997 Yang ............................ 346/1
5,697,715 A * 12/1997 Kuroda et al. .............. 400/237
5,878,670 A * 3/1999 Yamaguchi ................. 101/492
5,955,240 A * 9/1999 Sato et al. ............... 430/270.1
6,217,985 B1 * 4/2001 Hirukawa et al. .......... 428/195

FOREIGN PATENT DOCUMENTS

| | | | |
|---|---|---|---|
| JP | 5769087 | 4/1982 | |
| JP | 58183285 | 10/1983 | |
| JP | 789214 | 4/1995 | |
| JP | 410006654 A * | 1/1998 | .................... 175/4 |
| JP | 11139095 | 5/1999 | |

* cited by examiner

*Primary Examiner*—Andrew H. Hirshfeld
*Assistant Examiner*—Marvin P. Crenshaw
(74) *Attorney, Agent, or Firm*—Birch, Stewart, Kolasch & Birch, LLP

(57) ABSTRACT

A transfer foil for golf balls which achieves transfer printing at a temperature below 130° C. and provides a printed pattern having a superior durability. The transfer foil comprises a base film, and an ink layer carrying a pattern on one surface of the base film, the ink layer comprising a polyurethane resin having a hydroxyl value of less than 0.2 and a weight-average molecular weight of 20,000 to 60,000. The present invention also provides a golf ball, a method of printing a pattern, and a method of manufacturing a golf ball, which are all based on the use of the transfer foil.

6 Claims, 1 Drawing Sheet

TRANSFER FOIL FOR GOLF BALLS

BACKGROUND OF THE INVENTION

1. Field of the Invention

The present invention relates to a transfer foil for use in printing a pattern on a golf ball body, and to a golf ball printed with a pattern using the transfer foil, a method of printing a pattern with use of the transfer foil, and a method of manufacturing such a golf ball.

2. Description of the Related Art

A thermal transfer method using a transfer foil is employed in printing a pattern on a surface of a golf ball body. The typical transfer foil comprises a strip-like base film, and an ink layer carrying a predetermined pattern on one surface of the base film.

A conventional transfer foil had a release varnish layer between the base film and the ink layer. In case of printing a pattern on a surface of a ball body using the conventional transfer foil, the release varnish was also transferred when transferring the pattern carried by the ink layer to the surface of the ball body. The release varnish adhered to the surface of a transferred pattern on the ball body surface causes reduced adherence between the ball body surface and a topcoat thereon. To solve such a problem, various sorts of transfer foils without the need for release varnish have been proposed.

For example, Japanese Unexamined Patent Publication No. 57-69087 proposes a transfer foil having an ink layer which comprises a basic resin containing nitrocellulose and an alkyd resin, and a pigment or a dye as a coloring agent. Such an ink composition exhibits a good transferability, and therefor the ink allows the ink layer to be formed directly on the surface of the base film without a release varnish. However, a pattern carried by the ink layer can not be transferred at a temperature below 180° C.

Japanese Unexamined Patent Publication No. 58-183286 discloses a transfer foil having an ink layer containing a basic resin which comprises nitrocellulose and a resin selected from the group consisting of a polyamide resin, a hard resin, an acrylic resin, a polyester resin and a polyurethane resin. Using this transfer foil achieves transferring a pattern by pressing the transfer foil against a golf ball body surface for one second at 160° C. using a presser made of silicone rubber. However the temperature of 160° C. is still high for golf ball body having a cover made from a thermoplastic resin such as an ionomer. When the thermoplastic resin covered ball body is subjected to such a high temperature, dimples formed on the ball body surface are likely to be deformed, or in extreme cases the golf ball body itself may become deformed, which significantly affects the performance of the golf ball.

Japanese Unexamined Patent Publication No. 7-89214 proposes a transfer foil having an ink layer of which the basic resin is a polyurethane having a hydroxyl value ranging between 0.2 and 15. This transfer foil achieves transfer printing at 130° C. using a flat presser made of rubber. Further, the transfer foil can provide a good transferred pattern on the ball body surface suitable for a top coat This is because the hydroxyl group of the polyurethane resin contained in the ink layer reacts with the isocyanate contained in the two-pack polyurethane coating material to impart a higher strength to the transferred pattern. However, it is still possible that a golf ball having a cover made from a thermoplastic resin such as an ionomer becomes deformed at its dimples or its overall configuration when subjected to the temperature of 130° C.

The one transfer foil which achieves transfer printing at a temperature below 130° C. is only disclosed in Japanese Unexamined Patent Publication No. 11-139095. The basic resin forming the ink layer of this transfer foil contains a polyurethane having a hydroxyl value of less than 0.2 (inclusive of zero) and at least one of a polyester resin and an epoxy resin each having a hydroxyl value ranging between 60 and 250.

SUMMARY OF THE INVENTION

An object of the present invention is to provide a transfer foil which can achieve transfer printing at a temperature below 130° C. and provide a transferred pattern having a superior durability, and a golf ball having a printed pattern using the transfer foil, a method of printing a pattern with use of the transfer foil, and a method of manufacturing such a golf ball.

According to one aspect of the present invention, there is provided a transfer foil comprising a base film, and an ink layer carrying a predetermined pattern on one surface of the base film. The ink layer comprises a basic resin containing more than 80% by weight of a polyurethane having a hydroxyl value of less than 0.2 and a weight-average molecular weight of 20,000 to 60,000.

According to another aspect of the present invention, there is provided a golf ball comprising a golf ball body, a pattern directly printed on a surface of the golf ball body, and a clear coat formed over the pattern and the ball body surface. The pattern is defined by an ink containing a polyurethane having a hydroxyl value of less than 0.2 and a weight-average molecular weight of 20,000 to 60,000.

According to yet another aspect of the present invention, there is provided a method of printing a pattern on a golf ball body surface, comprising the steps of placing the inventive transfer foil on a surface of a golf ball body, and transferring the pattern carried by the transfer foil to the ball body surface from the transfer foil at a temperature below 130° C.

According to further aspect of the present invention, there is provided a method of manufacturing a golf ball, comprising the steps of printing a pattern to a surface of a ball body using the inventive transfer foil, and coating the ball body surface and the printed pattern with a polyurethane coating material.

The term "pattern" as used herein is meant to include any markings, trademarks, logos, lettering, figures, images or the like.

These and other objects, features and attendant advantages of the present invention will be more fully appreciated from the reading of the following detailed description.

DESCRIPTION OF THE PREFERRED EMBODIMENTS

Figure 1:
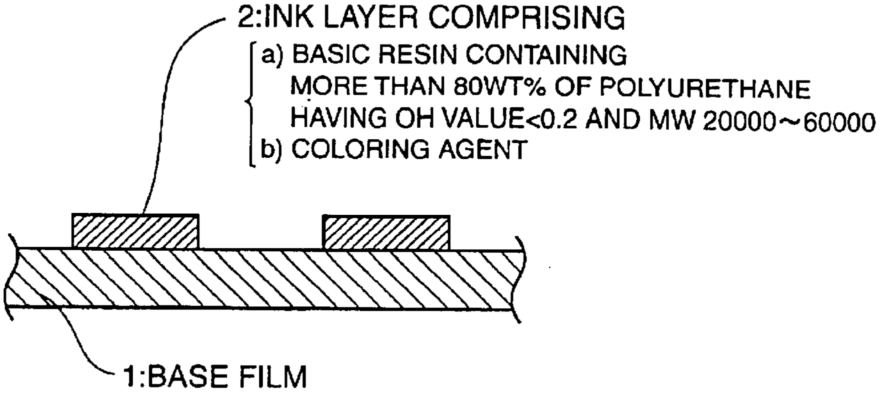
FIG. 1 is a schematic diagram showing the structure of a transfer foil of the present invention.

A transfer foil of the present invention, as shown in FIG. 1, comprises a base film 1 and an ink layer 2 carrying a predetermined pattern on one surface of the base film 1. The ink for used in the transfer foil comprises a basic resin containing a polyurethane as a major ingredient thereof, and a coloring agent.

The polyurethane used in the present invention has a weight-average molecular weight (hereinafter referred to as "molecular weight" simply) of 20,000 to 60,000 and a hydroxyl value of less than 0.2. Such a polyurethane is relatively low in molecular weight and has a small number of free hydroxyl groups, thereby eliminating necessity of forming giant molecules by mutual association of the polyurethane molecule. As a result, the polyurethane resin can be softened at a relatively low temperature thereby accomplishing thermal fusion boding of the transferred pattern defined by the polyurethane as an essential ingredient to a golf ball surface. Further, the polyurethane has a superior affinity with a polyurethane coating material which is typically used as a top coat for a golf ball.

The polyurethane has a molecular weight of 20,000 or more, preferably 25,000 or more, and 60,000 or less, preferably 56,000 or less, more preferably 40,000 or less. If the molecular weight of the polyurethane is less than 20,000, flexibility and elongation at break of the polyurethane are lowered and, hence, a transferred pattern defined by an ink containing the polyurethane can not exhibit enough deformation to follow up any deformation of the ball body, resulting in the transferred pattern exhibiting lowered wear resistance and impact resistance. If the molecular weight of the polyurethane is more than 60,000, the softening temperature of the polyurethane is raised to make a temperature when transferring a pattern (hereinafter referred to as "transfer temperature") undesirably higher.

The polyurethane used in the present invention has a hydroxyl value of less than 0.2, preferably zero. Stated otherwise, a polyurethane that is free of any hydroxyl group is preferable. As the hydroxyl value increases, polyurethane molecules become more likely to be associated with each other through hydrogen bonding or the like to form giant molecules, which in turn raise the softening temperature of the polyurethane make the transfer temperature undesirably higher.

Any polyurethane that satisfies the above requirements may be used in the present invention. A polyurethane can be obtained by reacting a polyisocyanate having two or more isocyanate groups with a polyalcohol having two or more hydroxyl groups. The molecular weight of the polyurethane can be adjusted to the above ranges by increasing a molecular weight of a prepolymer having an NCO group at a terminal thereof with use of a diamine, and the hydroxyl value of the polyurethane can be adjusted by blocking the terminal NCO group with a monofunctional compound such as a monoamine or a monoalcohol after finishing reaction between the prepolymer and the diamines.

Other polymers may be contained in the basic resin of the ink together with the above polyurethane. Other polymers include polymers which are free of any hydroxyl group and polymers which can be softened at a temperature below 130° C., for example, polyester, polyamide, and copolymer of vinyl chloride and vinyl acetate. It is necessary that addition of other polymer to the polyurethane dose not result in rising the softening temperature of the resulting ink. To meet the requirement, the proportion of the polyurethane in the basic resin is preferably 80% or more by weight, more preferably 90% or more by weight. Most preferably, the basic resin is substantially composed of the polyurethane.

The ink contains a coloring agent such as a pigment or a dye. The amount of such a coloring agent in the ink is not particularly limited and may be determined depending on factors such as the thickness of a pattern to be printed, the amount of the coloring agent in the ink preferably ranges from 1 to 50 parts by weight, more preferably from 5 to 30 parts by weight per 100 parts by weight of the ink.

Any conventional coloring agent may be used. Examples of coloring agents include: black pigments such as carbon blacks including acetylene black and aniline black; yellow pigments such as chrome yellow, zinc yellow, cadmium yellow, yellow iron oxide, mineral fast yellow, nickel-titanium yellow, Naples yellow, naphthol yellow S, Hansa yellow G, Hansa yellow 10G, benzidine yellow G, benzidine yellow GR, quinoline yellow lake, permanent yellow NCG and tartrazine lake; orange pigments such as chrome orange, molybdenum orange, permanent orange GTR, pyrazolone orange, vulcan orange, Indanthrene Brilliant Orange RK, benzidine orange G and Indanthrene Brilliant Orange GK; red pigments such as red oxide, cadmium red, red lead oxide, mercury sulfide cadmium, permanent red 4R, lithol red, pyrazolone red, Watchung red calcium salt, lake red D, brilliant carmine 6B, eosin lake, rhodamine lake B, alizarin lake and brilliant carmine 3B; violet pigments such as manganese violet, fast violet B and methyl violet lake; blue pigments such as Prussian blue, cobalt blue, alkali blue lake, Victoria blue lake, phthalocyanine blue, metal-free phthalocyanine blue, partially chlorinated phthalocyanine blue, fast sky blue and Indanthrene blue BC; green pigments such as chrome green, chrome oxide, pigment green B, malachite green lake, final yellow green G; and white pigments such as zinc white, titanium oxide, antimony white, zinc sulfide, baryta powder, barium carbonate, clay, silica, white carbon, talc and alumina white.

The ink used in the present invention may contain, in addition to the basic resin and the coloring agent, a plasticizer, a surfactant, an antioxidant, an ultraviolet absorber, a delustering agent, a solvent or the like, as required.

Any solvent which can dissolve the foregoing basic resin may be used. Examples of such solvents include aromatic hydrocarbons such as toluene and xylene, ester solvents such as ethyl acetate and butyl acetate, ether solvents such as dimethyl ether and diethyl ether, ketone solvents such as methyl ethyl ketone, and alcohol solvents such as methanol, ethanol and isopropyl alcohol. The amount of the solvent to be incorporated in the ink is preferably in the range of 20 to 80 parts by weight, more preferably in the range of 30 to 60 parts by weight based on 100 parts by weight of the ink. If the amount of the solvent in the ink is less than 20 parts by weight, the resulting ink will exhibit an increased viscosity, which nay result in poor workability. Further, the dispersibility of the polyurethane and coloring agent in the resulting ink may lower. On the other hand, if the amount of the solvent in the ink is more than 80 parts by weight, it will take a longer time for the ink to be dried or cured after transferring a pattern from the transfer foil, thereby lowering the productivity.

In the ink may be used various antioxidants such as phenolic antioxidants, sulfuric antioxidants and phosphoric antioxidants, and also various ultraviolet absorbers, for example, those of benzophenone-type, acrylate-type and salicylate-type.

Above-mentioned ink constitutes the ink layer 2 carrying a predetermined pattern on one surface of the base film 1.

Examples of the base films include polyethylene films, polypropylene films, polyester films, polyamide films, vinyl chloride films and cellophane films. Among them, polypropylene films are preferable. The base film preferably has a thickness of 0.3 to 5.0 μm, considering the easiness to reach the bottom of each dimple of a golf ball body when transferring a pattern from the transfer foil, the suitable adherence to the ink layer and the need of strength for printing process described below.

The thickness of the ink layer formed on one surface of the base film is appropriately determined depending on the forming process. The ink layer with a predetermined pattern is formed by gravure printing process, screen printing process, or the like.

Figure 2:
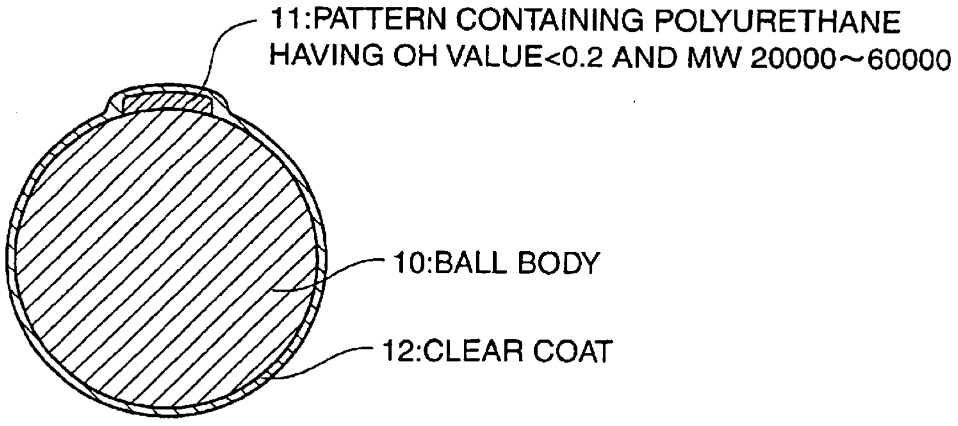
FIG. 2 is a schematic diagram showing the structure of a golf ball of the present invention.

An inventive golf ball comprises, as shown in FIG. 2, a ball body 10, a pattern 11 directly printed on a surface of the ball body 10 using the transfer foil of the present invention, and a clear coat 12 formed over the printed pattern 11 and the surface of the ball body 10.

The ball bodies used in the present invention may be one-piece type golf ball bodies, multi-piece type golf ball bodies such as two-piece type golf ball bodies, or thread-wound type golf ball bodies. Each of multi-piece type golf ball bodies and thread-wound type golf ball bodies has a cover. Examples of materials for the cover include ionomer resin, polyurethane resin, polyamide thermoplastic elastomer, polyester thermoplastic elastomer, and a mixture thereof.

The ball body may be subject to transferring process without application of a primer coat. The inventive transfer foil carrying a pattern is placed directly on the surface of the golf ball body. And the pattern is transferred to the surface of the ball body from the transfer foil by thermally transferring step.

The surface of the ball body may be pretreated before printing a pattern. A conventional pretreatment before application of top coat, such as a plasma treatment, a chemical treatment using some sort of chlorine chemical, and a sandblasting treatment may be employed. The sandblasting treatment is preferred, because it improves not only the adherence between the transferred pattern and the golf ball body surface but also the adherence between a coating layer as top coat and the ball body surface.

The thermal transfer step usually uses the rubber presser for pressing the transfer foil against the surface of the ball body. The surface temperature of the rubber presser, which is equivalent to the transfer temperature, is below 130° C., preferably below 125° C., more preferably below 120° C. Transferring a pattern at a temperature of 130° C. or higher may cause the deformed dimple configuration owing heat A lower transfer temperature is more preferable. However, the transfer temperature is preferably not lower than 90° C., more preferably not lower than 100° C. because the polyurethane, which is contained in the ink layer as an essential ingredient, needs to be sufficiently softened for thermal fusion bonding in order to give a transferred pattern free from chipping or void.

The transfer duration may be appropriately determined depending on the transfer temperature. Where the transfer temperature is not lower than 100° C. and below 130° C., the transfer duration is preferably two seconds or shorter.

A method of manufacturing a golf ball according to the present invention comprises the steps of printing a pattern by above mentioned transferring method, and coating the golf ball body surface and the printed pattern with a polyurethane coating material.

The coating step is conducted in order to protect the printed pattern, namely transferred pattern to the ball body surface from the transfer foil, and improve the cosmetic appearance of the resulting golf ball.

As the polyurethane coating material, a two-pack type polyurethane coating material is commonly employed that uses separate packages of a polyol and a polyisocyanate. The two-pack type polyurethane coating material can provide a preferable clear coating layer which has a sufficient flexibility and a sufficient elongation at break to follow up any deformation of the resulting golf ball. Besides, the polyurethane coating layer has a good affinity with the transferred pattern defined by the ink containing the specific polyurethane as a major ingredient.

EXAMPLES

Preparation of Transfer Foils

A biaxially-oriented, 20 μm-thick polypropylene film was subjected to a gravure printing process to prepare transfer foils Nos. 1 to 9, each transfer foil carries a pattern defined by the ink of respective compositions shown in TABLE 1.

Transfer foils Nos. 2 to 4, 6 and 8 correspond to examples of the present invention because each of them carries a pattern defined by the ink containing a polyurethane having molecular weight and hydroxyl value falling within the scope of the present invention. Transfer foils Nos. 1, 5 and 7 are comparative examples. Transfer foil No. 9 is a conventional one carrying a pattern defined by a conventional ink containing nitrocellulose as a basic resin.

Manufacture of Golf Balls

Each golf ball body having an ionomeric cover was pretreated by a sandblasting process, and then each of the transfer foils prepared as above was pressed against the golf ball surface using silicone rubber presser heated to 130° C. for one second, thereby transferring the pattern carried by the transfer foil to the golf ball body surface.

After the printing of the pattern, a two-pack type polyurethane coating material was sprayed to the golf ball body surface and the transferred pattern, and then heated so as to be dried and cured. Thus, each golf ball was completed.

Golf balls thus manufactured were each evaluated for transferability, impact resistance and wear resistance according to the evaluation method described below. The results of the evaluation together with the respective compositions of the inks are shown in TABLE 1.

Evaluation Method

1. Transferability

Transferability was evaluated for the case where the transfer temperature was 100° C. as well as for the case of 130° C.

Conditions of the transferred pattern to the ball body surface were visually observed immediately after transferring step before coating material being applied to the transferred pattern and the ball body surface. Transferability were evaluated on the following criteria: a condition where even an edge portion of a letter or figure as a pattern was completely transferred is rated "◎", a condition where there was no practical problem though some transfer residue was observed at an edge portion of the letter or figure is rated "○", a condition where there was a practical problem raised by some untransferred portions present in the letter or figure is rated "Δ", and a condition where transfer was not realized is rated "X".

2. Impact Resistance

Golf balls each having a polyurethane coating layer were caused to impinge upon a steel plate at a speed of 45 m/s 100 times repeatedly, and thereafter the transferred pattern on each golf ball was visually observed as to the degree of its damage. The condition of the transferred pattern on each golf ball immediately after having been subjected to the impingement test was compared with that of the pattern immediately after the manufacture of the ball for rating the degree of damage into three ranks: the rank "○" representing a condition where no peeling occurred, the rank "Δ" representing a condition where some peeling occurred, and the rank "X" representing a condition where substantial peeling occurred.

3. Wear Resistance

Water and sand were intensively sprayed to golf balls each having a polyurethane coating layer for ten minutes, and then the transferred pattern on each golf ball was visually observed as to its condition. The condition of the pattern immediately after having undergone this wearing test was compared with that of the pattern immediately after the manufacture of the golf ball for rating the peeling and wearing condition of the pattern into three ranks: the rank "○" representing a condition where no change was observed; the rank "Δ" representing a condition where some peeling or wearing was observed; and the rank "X" representing a condition where the most part of the pattern was peeled or worn.

TABLE 1

| | | OH value | Molecular Weight | No 1 | 2 | 3 | 4 | 5 | 6 | 7 | 8 | 9 |
|---|---|---|---|---|---|---|---|---|---|---|---|---|
| BASIC RESIN (parts by weight) | Polyurethane | 0 | 14000 | 100 | — | — | — | — | — | — | — | — |
| | | 0 | 25000 | — | 100 | — | — | — | — | — | — | — |
| | | 0 | 35000 | — | — | 100 | — | — | — | — | — | — |
| | | 0 | 56000 | — | — | — | 100 | — | — | — | — | — |
| | | 0 | 70000 | — | — | — | — | 100 | — | — | — | — |
| | | 0.1 | 35000 | — | — | — | — | — | 100 | — | — | — |
| | | 3 | 35000 | — | — | — | — | — | — | 100 | — | — |
| | | 0 | 35000 | — | — | — | — | — | — | — | 90 | — |
| | nitrocellulose | — | — | — | — | — | — | — | — | — | — | 70 |
| | Polyamide | — | — | — | — | — | — | — | — | — | 10 | 30 |
| Carbon black (parts by weight) | | | | 50 | 50 | 50 | 50 | 50 | 50 | 50 | 50 | 50 |
| Silica (parts by weight) | | | | — | — | — | — | — | — | — | — | 20 |
| Plasticizer (parts by weight) | | | | — | — | — | — | — | — | — | — | 30 |
| Polyethylene Wax (parts by weight) | | | | — | — | — | — | — | — | — | — | 5 |
| Evaluation | Transferability | 100° C. | | ◎ | ◎ | ◎ | ○ | Δ | ○ | Δ | ◎ | X |
| | | 130° C. | | ◎ | ◎ | ◎ | ◎ | ○ | ◎ | ○ | ◎ | Δ |
| | Impact Resistance | | | ○ | ○ | ○ | ○ | ○ | ○ | ○ | ○ | ○ |
| | Wear Resistance | | | Δ | ○ | ○ | ○ | ○ | ○ | ○ | ○ | ○ |

Evaluation

From comparisons among transfer foils Nos. 1 to 5, it is found that the transferability at 100° C. was lowered as the molecular weight of the polyurethane as a basic resin became greater. Therefore using the higher molecular weight of the polyurethane for the transfer foil is difficult to lower the transfer temperature. Further, it is found that when the molecular weight of the polyurethane was too small, the wear resistance of the transferred pattern was low (see No. 1). Consequently, when the molecular weight of the polyurethane falling within the range from 20,000 to 60,000 is used for a transfer foil, the resulting transfer foil exhibits a superior transferability even at 100° C. and the transferred pattern to the ball body surface exhibits satisfactory impact resistance and wear resistance.

It can be understood from comparisons among Nos. 3, 7 and 8 that the transferability was lowered with increasing hydroxyl value even though the molecular weight was constant. Transfer foil No.7, wherein a polyurethane having the hydroxyl value of 3 is contained, could not give a satisfactory transferred pattern onto a ball body surface by transferring process at 100° C.

Transfer foil No. 8 proved that the mixing ratio of other polymer with the polyurethane being about 10% or smaller by weight based on the total weight of the basic resin did not affect the transferability, impact resistance and wear resistance.

Transfer foil No. 9 which was equivalent to a conventional transfer foil could not give a satisfactory transferred pattern by transferring process even at 130° C.

The transfer foil for golf balls according to the present invention can give a good transferred pattern at a transfer temperature below 130° C. without deformation of dimples formed on a golf ball body surface. Further, the pattern transferred from the transfer foil to a golf ball body exhibits superiority in durability such as impact resistance and wear resistance.

Consequently, a golf ball printed with a pattern using the transfer foil for golf balls according to the present invention can exhibit the performance as expected at the time of golf ball designing, with its transferred printed pattern having a superior durability.

While only certain preferred embodiments of the present invention have been described in detail, as will be apparent for those skilled in the art, certain changes and modifications may be made in embodiment without departing from the scope of the present invention as defined by the following claims.

What is claimed is:

1. A golf ball comprising:

a golf ball body;

a pattern directly printed on a surface of the golf ball body, the pattern being defined by an ink comprising a basic resin containing a polyurethane having a hydroxyl value of less than 0.2 and a weight-average molecular weight of 20,000 to 60,000, and a coloring agent; and a clear coat formed over the pattern and the ball body surface;

wherein the basic resin further contains a polymer which is substantially free of hydroxyl groups.

2. The golf ball according to claim 1, wherein the basic resin contains 80% or more by weight of the polyurethane.

3. The golf ball according to claim 1, wherein the polymer is polyester, polyamide, or a copolymer of vinyl chloride and vinyl acetate.

4. The golf ball according to claim 1, wherein the basic resin consists essentially of the polyurethane.

5. The golf ball according to claim 1, wherein the polyurethane of the ink has a weight-average molecular weight of 25,000 to 56,000.

6. The golf ball according to claim 1, wherein the polyurethane of the ink has a weight-average molecular weight of 25,000 to 40,000.

* * * * *